United States Patent
Baker et al.

(10) Patent No.: US 8,606,720 B1
(45) Date of Patent: Dec. 10, 2013

(54) SECURE STORAGE OF PAYMENT INFORMATION ON CLIENT DEVICES

(75) Inventors: David Preston Baker, New York, NY (US); Stanley N. Marshall, III, Mountain View, CA (US); Mohamed Reza Hussein, San Francisco, CA (US); Matthew Eric Hiller, New York, NY (US); Chin Pang Tung, Sunnyvale, CA (US); Andrew Robert Mitchell, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 49 days.

(21) Appl. No.: 13/541,469

(22) Filed: Jul. 3, 2012

Related U.S. Application Data (60) Provisional application No. 61/559,140, filed on Nov. 13, 2011.

(51) Int. Cl.
*G06Q 20/00* (2012.01)

(52) U.S. Cl.
USPC .............................................. 705/76; 705/64

(58) Field of Classification Search
USPC .......................................................... 705/76
See application file for complete search history.

(56) References Cited

U.S. PATENT DOCUMENTS

| | | | |
|---|---|---|---|
| 5,371,797 A * | 12/1994 | Bocinsky, Jr. | 705/70 |
| 5,815,657 A | 9/1998 | Williams et al. | |
| 6,101,482 A | 8/2000 | DiAngelo et al. | |
| 6,609,113 B1 | 8/2003 | O'Leary et al. | |
| 6,904,569 B1 | 6/2005 | Anderson | |
| 6,925,444 B1 * | 8/2005 | McCollom et al. | 705/14.51 |
| 6,931,382 B2 | 8/2005 | Laage et al. | |
| 6,941,285 B2 * | 9/2005 | Sarcanin | 705/67 |
| 6,965,880 B2 | 11/2005 | Komori | |
| 7,159,180 B2 | 1/2007 | Ward | |
| 7,318,049 B2 | 1/2008 | Iannacci | |
| 7,343,351 B1 | 3/2008 | Bishop et al. | |
| 7,356,606 B2 | 4/2008 | Choate | |
| 7,512,567 B2 | 3/2009 | Bemmel et al. | |
| 7,801,827 B2 | 9/2010 | Bishop et al. | |
| 7,953,671 B2 | 5/2011 | Bishop et al. | |

(Continued)

FOREIGN PATENT DOCUMENTS

| | | |
|---|---|---|
| WO | WO 2008/005018 A2 | 1/2008 |
| WO | WO 2008/157806 A2 | 12/2008 |
| WO | WO 2010/110625 A2 | 9/2010 |

OTHER PUBLICATIONS

Lubbers et al., Pro HTML5 Programming, 2010, Apress, pp. 213-241.*

(Continued)

*Primary Examiner* — Jacob C. Coppola
(74) *Attorney, Agent, or Firm* — Johnson, Marcou & Isaacs, LLC (57) ABSTRACT

An online electronic wallet system and method provide secure storage and transmission of payment instrument information for use in completing online purchases initiated from a client device. A payment instrument's verification code is stored in an encrypted form in local storage on a client device and retrieved and re-encrypted along with other payment instrument information stored on the system using a merchant-specific key. An API library is used to integrate the online electronic wallet system with a registered merchant's purchase flow, including the ability to ensure receipt of an electronic receipt prior to communicating payment instrument information to a merchant server.

22 Claims, 7 Drawing Sheets

(56) References Cited

U.S. PATENT DOCUMENTS

| | | | |
|---|---|---|---|
| 7,996,268 B2 | 8/2011 | Poltorak | |
| 7,996,324 B2 | 8/2011 | Bishop et al. | |
| 8,019,811 B1 | 9/2011 | Britto et al. | |
| 8,060,413 B2 | 11/2011 | Castell et al. | |
| 8,073,460 B1 | 12/2011 | Scofield et al. | |
| 8,117,089 B2 | 2/2012 | Minsky et al. | |
| 8,126,806 B1 | 2/2012 | DiMartino et al. | |
| 8,150,767 B2 | 4/2012 | Wankmueller | |
| 8,214,299 B2 | 7/2012 | Bishop et al. | |
| 2001/0051902 A1 | 12/2001 | Messner | |
| 2001/0054012 A1 | 12/2001 | Nayyar | |
| 2002/0038287 A1* | 3/2002 | Villaret et al. | 705/41 |
| 2002/0042776 A1 | 4/2002 | Woo et al. | |
| 2002/0065774 A1 | 5/2002 | Young et al. | |
| 2002/0069139 A1 | 6/2002 | Bernstein et al. | |
| 2002/0107755 A1 | 8/2002 | Steed et al. | |
| 2002/0179704 A1 | 12/2002 | Deaton | |
| 2003/0110133 A1 | 6/2003 | Maritzen et al. | |
| 2003/0182221 A1 | 9/2003 | Forrest et al. | |
| 2003/0191945 A1* | 10/2003 | Keech | 713/182 |
| 2004/0139032 A1* | 7/2004 | Rowan | 705/80 |
| 2004/0165009 A1 | 8/2004 | Blakely et al. | |
| 2004/0243501 A1 | 12/2004 | Duffey, Jr. | |
| 2004/0249712 A1 | 12/2004 | Brown et al. | |
| 2004/0254979 A1 | 12/2004 | Colling et al. | |
| 2004/0260657 A1 | 12/2004 | Cockerham | |
| 2006/0041638 A1 | 2/2006 | Whittaker et al. | |
| 2006/0166740 A1 | 7/2006 | Sufuentes | |
| 2006/0173974 A1 | 8/2006 | Tang | |
| 2006/0219774 A1 | 10/2006 | Benco et al. | |
| 2006/0287965 A1* | 12/2006 | Bajan | 705/75 |
| 2007/0016630 A1 | 1/2007 | Samji et al. | |
| 2007/0106564 A1 | 5/2007 | Matotek et al. | |
| 2007/0149183 A1 | 6/2007 | Dunko et al. | |
| 2007/0245882 A1 | 10/2007 | Odenwald | |
| 2007/0283268 A1 | 12/2007 | Berger et al. | |
| 2007/0294292 A1 | 12/2007 | Hydrie et al. | |
| 2008/0017704 A1 | 1/2008 | VanDeburg et al. | |
| 2008/0103982 A1* | 5/2008 | Hammad et al. | 705/66 |
| 2008/0147546 A1 | 6/2008 | Weichselbaumer et al. | |
| 2008/0208681 A1 | 8/2008 | Hammad et al. | |
| 2008/0208742 A1 | 8/2008 | Arthur et al. | |
| 2008/0208744 A1 | 8/2008 | Arthur et al. | |
| 2008/0208762 A1 | 8/2008 | Arthur et al. | |
| 2008/0249938 A1 | 10/2008 | Drake-Stoker | |
| 2008/0270253 A1 | 10/2008 | Huang | |
| 2008/0275779 A1 | 11/2008 | Lakshminarayanan | |
| 2008/0318559 A1 | 12/2008 | Porco | |
| 2009/0063312 A1 | 3/2009 | Hurst | |
| 2009/0157450 A1 | 6/2009 | Athsani et al. | |
| 2009/0170483 A1 | 7/2009 | Barnett et al. | |
| 2009/0173782 A1* | 7/2009 | Muscato | 235/379 |
| 2009/0210308 A1 | 8/2009 | Toomer et al. | |
| 2009/0234751 A1 | 9/2009 | Chan et al. | |
| 2009/0254437 A1 | 10/2009 | Lee et al. | |
| 2010/0063906 A1 | 3/2010 | Nelsen et al. | |
| 2010/0082485 A1 | 4/2010 | Lin et al. | |
| 2010/0088237 A1 | 4/2010 | Wankmueller | |
| 2010/0114731 A1 | 5/2010 | Kingston et al. | |
| 2010/0125495 A1 | 5/2010 | Smith et al. | |
| 2010/0125510 A1 | 5/2010 | Smith et al. | |
| 2010/0131347 A1 | 5/2010 | Sartipi | |
| 2010/0145751 A1 | 6/2010 | Berry et al. | |
| 2010/0153519 A1 | 6/2010 | Takayama et al. | |
| 2010/0161493 A1 | 6/2010 | Bennau et al. | |
| 2010/0169182 A1 | 7/2010 | Madani | |
| 2010/0217682 A1 | 8/2010 | Chan | |
| 2010/0228624 A1 | 9/2010 | Morris et al. | |
| 2010/0241565 A1 | 9/2010 | Starai et al. | |
| 2010/0260388 A1 | 10/2010 | Garrett et al. | |
| 2010/0291899 A1 | 11/2010 | Machani | |
| 2010/0306113 A1 | 12/2010 | Gray et al. | |
| 2010/0332336 A9 | 12/2010 | Quigley et al. | |
| 2011/0087595 A1 | 4/2011 | Sabella | |
| 2011/0184790 A1 | 7/2011 | Deol Brar et al. | |
| 2011/0208575 A1 | 8/2011 | Bansal et al. | |
| 2011/0211689 A1 | 9/2011 | von Mueller et al. | |
| 2011/0212711 A1 | 9/2011 | Scott | |
| 2011/0276569 A1* | 11/2011 | Kanefsky | 707/736 |
| 2012/0078735 A1 | 3/2012 | Bauer et al. | |
| 2012/0095853 A1 | 4/2012 | von Bose et al. | |
| 2012/0116921 A1 | 5/2012 | Fogel et al. | |
| 2012/0117455 A1 | 5/2012 | Fogel et al. | |
| 2012/0117569 A1 | 5/2012 | Fogel et al. | |
| 2012/0158654 A1* | 6/2012 | Behren et al. | 707/626 |
| 2012/0203696 A1 | 8/2012 | Morgan et al. | |
| 2012/0253985 A1 | 10/2012 | Maron et al. | |
| 2012/0267432 A1 | 10/2012 | Kuttuva | |

OTHER PUBLICATIONS

Oehlman et al., HTML5 Storage APIs, 2011, Apress, pp. 47-63.*
Title: Wayback Machine Internet Archive, American Express Membership Rewards Program, pp. 1-3 Date: Nov. 18, 2000.
Title: Cellfire, online, retrieved from the Internet <URL:http://www.cellfire.com/whatiscf.php> originally retrieved Sep. 20, 2010, pp. 1 Date: Jul. 25, 2012.
U.S. Appl. No. 13/235,167 to von Behren et al., filed Sep. 16, 2011.
U.S. Appl. No. 13/412,957 to von Behren et al., filed Mar. 6, 2012.
U.S. Appl. No. 13/277,182 to von Behren et al., filed Oct. 19, 2011.
U.S. Appl. No. 13/541,402 to Baker et al., filed Jul. 3, 2012.
U.S. Appl. No. 13/541,460 to Baker et al., filed Jul. 3, 2012.
U.S. Appl. No. 12/886,928 to Waylonis et al., filed Sep. 21, 2010.
U.S. Appl. No. 13/729,672 to Hiller et al., filed Dec. 28, 2012.
Author:Coppola, J. C., Title: Office Action cited in co-pending U.S. Appl. No. 13/541,402, filed Jul.3, 2012, pp. 1-29, Date: Nov. 5, 2012.

* cited by examiner

Method for encrypting payment information stored between electronic wallet system and client device

705
Selecting user's payment information from user account index based on the user's identifier 710
Requesting encrypted CVV information from user's client device 715
Receiving and decrypt encrypted CVV information with storage key 720
Re-encrypting CVV and remaining payment information with a merchant-specific encryption information to generate encrypted full payment information 725
Deleting decrypted and re-encrypted CVV from electronic payment system To 220 of Fig. 2

SECURE STORAGE OF PAYMENT INFORMATION ON CLIENT DEVICES

RELATED APPLICATIONS

This application claims priority to U.S. Provisional Patent Application No. 61/559,140 filed Nov. 13, 2011 and entitled "Online Wallet System." The entire contents of the above-identified priority application are hereby fully incorporated herein by reference.

TECHNICAL FIELD

The present disclosure relates generally to systems and methods for completing online purchases initiated on client devices, such as mobile devices. More particularly, the present invention provides systems and methods for the secure storage and transmission of payment information using an online electronic wallet.

BACKGROUND

An increasing number of purchases are made online. In addition, the growth in mobile client devices, such as smart phones and tablet computers, has enabled consumers to make online purchases on the go. However, providing the necessary payment instrument information can be laborious when working from these types of client devices. Accordingly, it is desirable to have a secure payment mechanism that requires minimal data entry on the user's part to complete the online transaction. One way to address this situation is to store a user's payment information in a payment instrument server and to allow the user to select the payment instrument they would like to use to complete an online purchase. However, limitations to this online wallet approach exist. Primarily, regulatory limitations exist regarding how much payment information may be permanently stored on a payment instrument server. For example, current regulations mandate that a consumers card verification value (CVV) may not be stored on third party payment instrument server.

Accordingly, a need exists for providing a way to securely store verification codes, such as CVV information, apart from the rest of the payment instrument information, retrieve the verification code information and remaining payment instrument information in response to a user's initiation of an online purchase, and securely communicate the payment instrument information to an online merchant server with minimal data input from the user.

In addition, when completing online transactions, it is often the case that the consumer does not receive a final listing of items purchased in their online shopping cart, or online receipt, until after payment instrument information has been provided and processed by the merchant server. In some instances, a merchant server may not provide this information, and in other instances interruptions in communication between the purchaser's device and merchant server can result in the failure to receive a final receipt.

Accordingly, a need exists for payment process flows that ensure the purchaser receives an online receipt prior to communicating payment instrument information to a merchant server.

SUMMARY

In certain exemplary aspects, a method for secure storage of payment instrument information comprises receiving, at an online electronic wallet system, payment instrument information from a user, storing the payment instrument information, minus a verification code, in the online electronic wallet system, encrypting the verification code with an encryption key, storing the verification code in local storage on one or more client devices, and deleting the verification code and encrypted verification code information from the online electronic wallet server.

In certain other exemplary aspects, a method for securely transmitting payment instrument information of online transactions initiated on a client device comprises receiving a payment information request from a merchant server at an online electronic wallet system, selecting by the online electronic wallet system the corresponding payment instrument information, retrieving an encrypted verification code stored on a client device corresponding to the payment instrument information, decrypting the verification code with the an encryption key used to encrypt the verification code prior to storage on the local device, re-encrypting the verification code and the remaining payment instrument information using a merchant-specific encryption key, and communicating the requested payment instrument information to the merchant server.

In certain other exemplary aspects, a method for ensuring optimal receipt flow during an electronic transaction comprises receiving at an online electronic wallet system a request for full payment information from a merchant server, verifying by the online electronic wallet system that the request for payment information includes a copy of the online shopping cart information, generating an electronic receipt from the online shopping cart information, and storing the electronic receipt in a user's online electronic wallet account.

These and other aspects, objects, features, and advantages of the exemplary embodiments will become apparent to those having ordinary skill in the art upon consideration of the following detailed description of illustrated exemplary embodiments, which include the best mode of carrying out the invention as presently perceived.

DETAILED DESCRIPTION OF EXEMPLARY EMBODIMENTS

Overview

The present invention is directed to an online electronic wallet system that lets buyers pass their payment information, shipping address, and other personal information stored within the online electronic wallet system to a specific online commerce merchant for use in a specific online transaction. It supports mobile web, mobile native application, and desktop web buy flows. An exemplary online electronic wallet system comprises a online wallet API library, an online wallet server, a payment instrument server, and a client-device running a browser application or mobile application for communicating with merchant servers, and having a local storage data structure for storing part of a payment instrument's payment information. The online wallet server, payment instrument server, merchant servers, and client devices, collectively "the network devices," may communicate over a network. The online wallet API library comprises a set of APIs associated with corresponding user interfaces (UIs) that allow a user to initiate an online wallet purchase from within a merchant buy flow such as from a merchant checkout web page. The online wallet server generates one or more user interfaces allowing the user to select the desired payment information from online wallet accounts stored in the payment instrument server and communicates secure payment information to the merchant server for payment processing. A payment instrument server stores one or more payment instruments in an associated online wallet account. A "payment instrument" is a form of payment such as a credit card, stored value card (for example, a gift card), or a debit card. Each payment instrument comprises corresponding payment information, such as credit card number, expiration date, and verification code. The "verification code" represents a portion of complete payment information needed to authorize a payment transaction using a given payment instrument. For example, the verification code may be the CVV of a credit card payment instrument, a short numerical code used to verify gift card payment transactions, or a personal identification number, such as personal identification numbers used in direct carrier billing.

The inventive functionality of the invention will be explained in more detail in the following description, read in conjunction with the figures illustrating the program flow.

Turning now to the drawings, in which like numerals indicate like (but not necessarily identical) elements throughout the figures, exemplary embodiments are described in detail.

System Architecture

Figure 1:
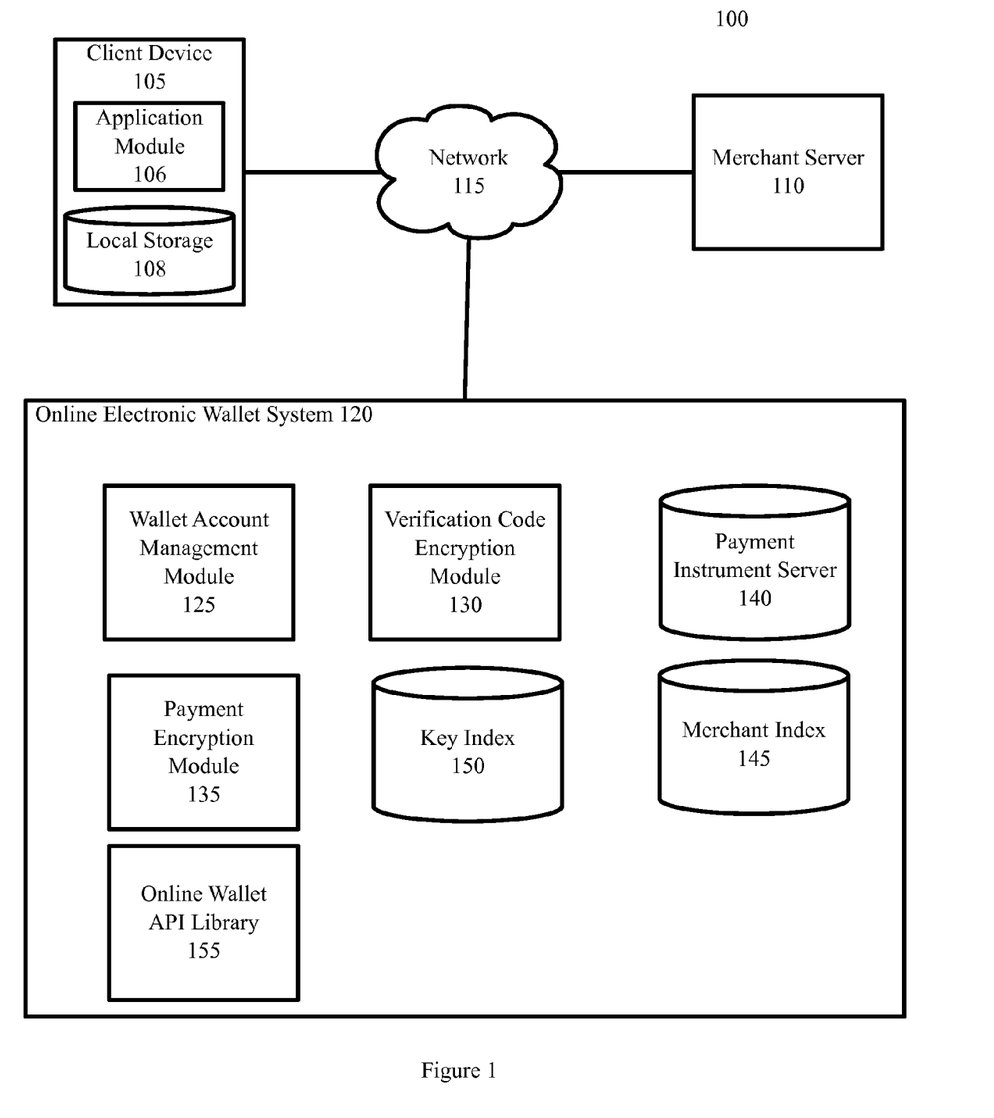
FIG. 1 is a block diagram depicting an online electronic wallet system according to an exemplary embodiment.

FIG. 1 is a block diagram depicting an online electronic wallet system 100 according to an exemplary embodiment. As depicted in FIG. 1, the system 100 includes network devices 105, 110, and 120, that are configured to communicate with one another via one or more networks 115.

Each network 115 includes a wired or wireless telecommunication means by which network devices (including devices 105, 110, 120) can exchange data. For example, each network 115 can include a local area network ("LAN"), a wide area network ("WAN"), an intranet, an Internet, a mobile telephone network, or any combination thereof. Throughout the discussion of exemplary embodiments, it should be understood that the terms "data" and "information" are used interchangeably herein to refer to text, images, audio, video, or any other form of information that can exist in a computer-based environment.

Each network device 105, 110, 120 includes a device having a communication module capable of transmitting and receiving data over the network 115. For example, each network device 105, 110, 120 can include a server, desktop computer, laptop computer, tablet computer, smart phone, handheld computer, personal digital assistant ("PDA"), or any other wired or wireless, processor-driven device. In the exemplary embodiment depicted in FIG. 1, the network devices 105, 110, 120 are operated by end-users or consumers, merchants with an online store or web site, and a an online electronic wallet system operator respectively The client network devices 105 each include an application module 106 and local storage 108. The application module may be a browser application such as Microsoft Internet Explorer, Firefox, Google Chrome, Safari, or another suitable application for interacting with web page files maintained by the merchant server 110, online electronic wallet system 120 and/or other network devices. The web page files can include text, graphic, images, sound, video, and other multimedia or data files that can be transmitted via the network 115. For example, the web page files can include one or more files in the Hypertext Markup Language ("HTML"). The browser application module 106 can receive web page files from the merchant server 110 and/or online electronic wallet system 120 and can display the web page files to end users operating the end user network devices 105. The application module 106 may also comprise a mobile application that resides on a mobile device of the user 105. Local storage 108 can include any local data structure on the client device 105 suitable for storing encrypted information, such as HTML5 local storage.

In one exemplary embodiment, the online electronic wallet system (OEWS) 120 comprises a wallet account management module 125, a verification code encryption module 130, a payment encryption module 135, an payment instrument server 140, a merchant index 145, a key index 150, and an online wallet API library 155. The wallet account management module 125 communicates with client devices 105 and merchant servers 110 to register theses network devices with the OEWS 120 and to facilitate requests and receipt of information between the OEWS 120, the client devices 105, and merchant servers 110. The wallet account management module 125 manages the registration of user and merchant accounts with the OEWS 120. Regarding user account registration, the wallet account management module 125 may generate web-based user interfaces providing the forms necessary for a user to register for an online electronic wallet account. For example, the wallet account management module 125 can collect basic user identifying information, registration information on one or more mobile devices, and payment information. The user account information is stored in a user account in the payment instrument server 140. Regarding merchant account registration, the wallet account management module 125 may likewise provide user-interfaces that provide the forms necessary for a merchant to register account information with the OEWS 120. Merchant account information including, but not limited to, merchant name, physical address, billing address, and merchant identifier is stored in the merchant index 145. Registered merchants provide their own merchant-specific encrypting keys which are stored in the key index 150. In addition, the wallet account management module 125 provides the registered merchants with access to the online API library 155, such as a JavaScript library, comprising the forms and associated UIs required to interface the OEWS 120 with a merchant's purchase flow. The verification code encryption module 130 utilizes a storage encryption key to encode a verification code provided by the user. The encrypted verification code is then stored in local storage 108, such as HTML5 storage or separate memory, on the user's client device 105 or devices. The verification code encryption module 130 likewise decrypts the encrypted verification code using the storage encryption key when collecting full payment information for communication to a merchant server 110. The storage encryption key used for encrypting and decrypting the verification code is stored in a key index 150. The payment encryption module 135 encrypts full payment information with a merchant-specific encryption key prior to communication of full payment information to a merchant server 120.

The OEWS 120 is described in more detail hereinafter with reference to the methods depicted in FIGS. 2-7. For ease of reference, the exemplary embodiments discussed in FIGS. 2-7 will refer to a CVV verification code. However, the OWES 120 of the present invention may be adapted for use with other verification codes such as those described above in the preceding paragraphs.

System Process

Figure 2:
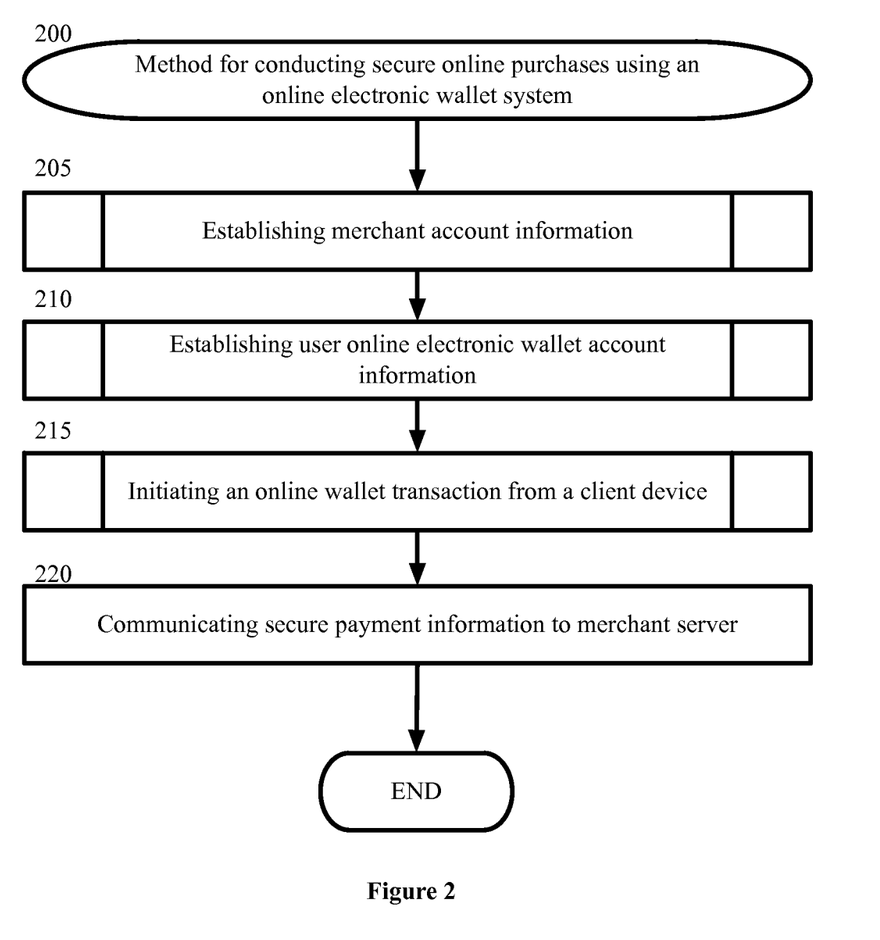
FIG. 2 is a block flow diagram depicting a method for conducting secure online purchases using an online electronic wallet system according to an exemplary embodiment.

FIG. 2 is a block flow diagram depicting a method 200 for conducting secure online purchases using the OEWS 120. The method 200 is described with reference to the components in FIG. 1.

Method 200 begins with block 205 where a merchant who wishes to provide customers with the ability to pay using the OEWS 120 registers with the system. The wallet account management module 125 provides a user interface where the merchant can register basic identifying information such as name and place of business. Block 205 will be described in further detail hereinafter with reference to FIG. 3.

Figure 3:
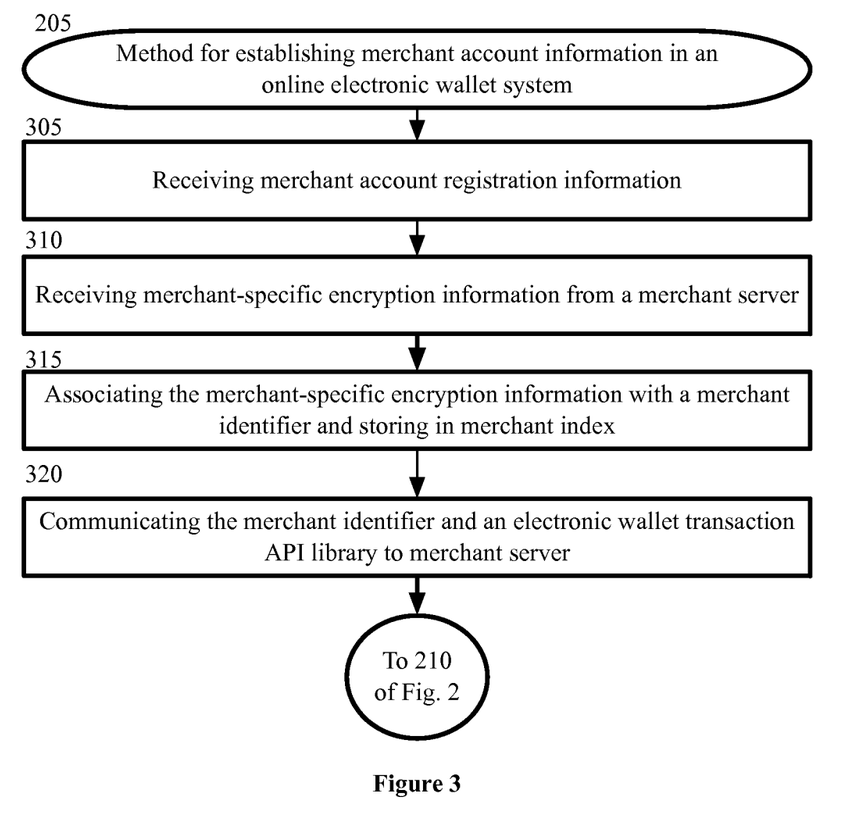
FIG. 3 is a block flow diagram depicting a method for establishing merchant account information with an online electronic wallet system according to an exemplary embodiment.

FIG. 3 is a block flow diagram depicting an exemplary process 205 for establishing merchant account information in the OEWS 120. The process 205 is described with reference to the components illustrated in FIG. 1.

Method 205 begins with block 305 where the OEWS 120 receives merchant registration information from a merchant. The wallet account management module 125 creates a merchant account record in the merchant index 145 and assigns the merchant a merchant-specific identifier. The merchant registration information includes at least a merchant name and business address as well as any banking or payment processing information needed to direct the payment information to the merchant's payment processor.

At block 310, the wallet account management module 125 receives a merchant-specific encryption key from the merchant server 110.

At block 315, the merchant-specific encryption key is associated with the merchant identifier. The merchant-specific encryption key may be stored with the merchant account record in the merchant index 145, or may be stored in a separate encryption key index such as the key index 150. The merchant specific encryption key is a public key of a public/private key pair and used to encrypt a user's full payment instrument information prior to communicating the full payment instrument information to the merchant server as discussed in further detail below regarding FIG. 7.

At block 320 the wallet account management module 125 communicates the merchant identifier and an online wallet API library 155 to the merchant server 110. The online wallet API library comprises the APIs and user interfaces needed to integrate the OEWS into a merchant's existing mobile/desktop web purchase flow. Alternatively, the online wallet API may be integrated into native mobile purchase flows, such as integration into a native iOS or Android API. The online payment API library allows the merchant to request masked wallet information for user-selected objects from the payment instrument server, which is returned to the merchant for display and logic in their purchase flow with the user. The request may further involve user interaction with a buyer interface generated by the online wallet server to authenticate the user and/or select wallet instruments. The payment wallet API library 155 also allows the merchant to send the final order information to an OEWS 120 when the buyer indicates their intent to complete the purchase, and to receive the full details of the buyer's online shopping cart. The process for initiating an online transaction using the online wallet API library is discussed in further detail below in reference to FIG. 5 and FIG. 6.

Returning to FIG. 2, at block 210 where a client device 105 establishes an online electronic wallet account by registering with the OEWS 120. Block 210 will be described in further detail hereinafter with reference to FIG. 4.

Figure 4:
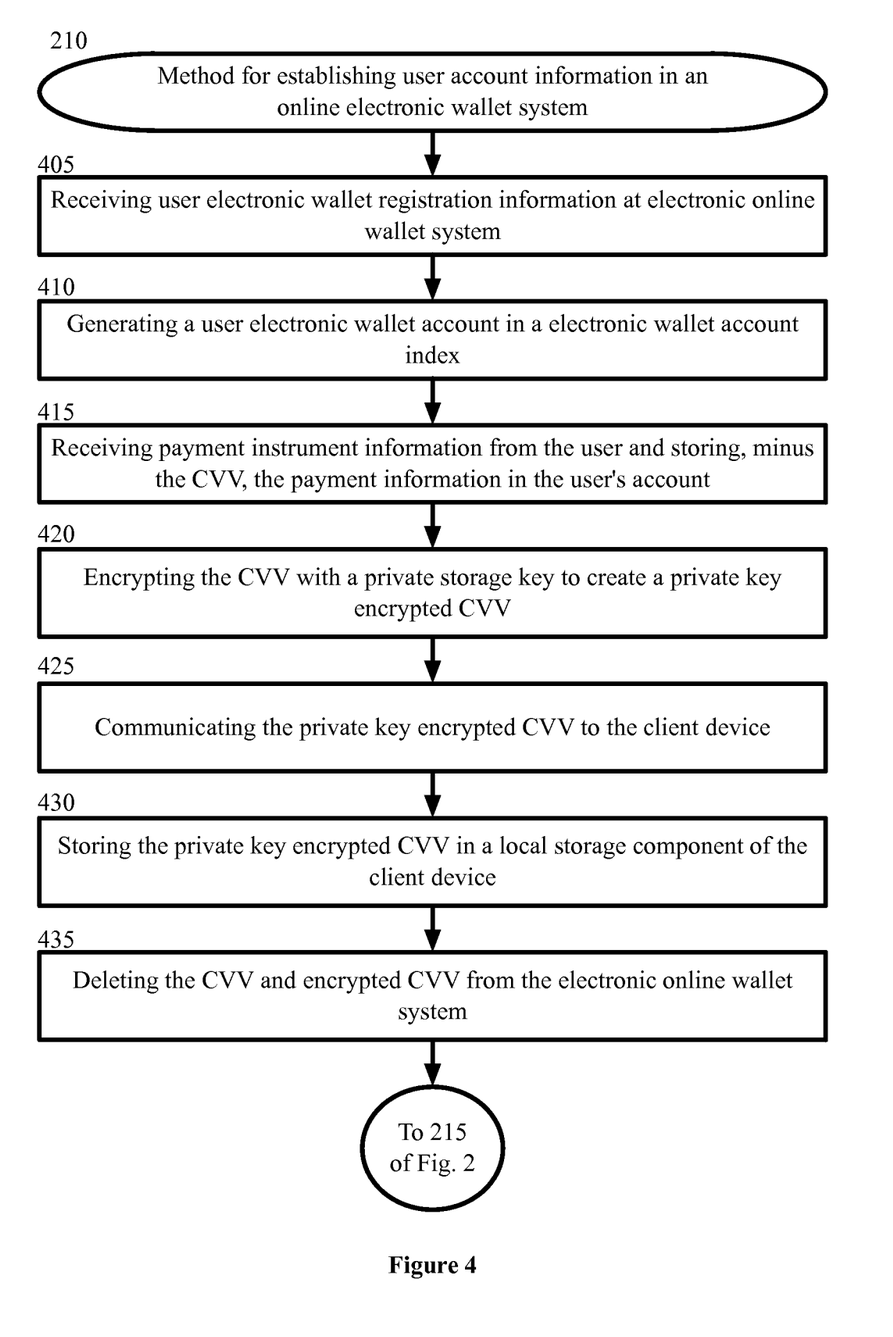
FIG. 4 is a block flow diagram depicting a method for establishing user account information with an online electronic wallet system according to an exemplary embodiment.

FIG. 4 is a block flow diagram depicting a process 210 for establishing user account information in the OEWS 120. The process 210 is described with reference to the components illustrated in FIG. 1.

Process 210 begins with block 405 where the online electronic wallet system 120 receives a user's electronic wallet registration information.

At block 410, the wallet account management module 125 creates a user online electronic wallet account record in the payment instrument server 140 and assigns the user a user identifier. The online wallet account management module may further register one or more client device identifiers with the user's account. In certain exemplary embodiments, the client device identifier may be used in place of, or in addition to, the user identifier to verify that an online transaction has been initiated by a user registered with the OEWS 120.

At block 415, the wallet account management module 125 receives one or more payment instruments for a user's wallet account. All payment instrument information for each payment instrument, except the CVV, is stored by the wallet account management module 125 in the user's account in the payment instrument server 140. As used herein, the payment instrument information that is stored in a user's account in the payment instrument server 140 is referred to as "partial payment information." In certain exemplary embodiments, the payment instrument server 140 may reside in a physically distinct location from the rest of the OEWS 120. In certain exemplary embodiments, the payment instrument server 140 may be a high security server with limited access privileges separate from those needed to access the rest of the OEWS 120.

At block 420, the verification encryption module 130 uses a storage encryption key to encrypt the CVV information and create an encrypted CVV. In certain exemplary embodiments, the storage encrypted key is a public/private key pair. In certain exemplary embodiments, the CVV is encrypted with the public key of a public/private key pair, and decrypted with the private key of the public/private key pair. In one exemplary embodiment, the CVV may be encrypted with one or more keys. For example, the CVV may be encrypted with a first key type and then encrypted again with a second key type. For example, the CVV may be encrypted with a AES key, such as an AES-256 session key, and the AES key in turn may be encrypted with a RSA key. The OEWS 120 may utilize a single public/private key pair, multiple public/private key pairs for each defined set of user accounts, or individual public/private key pairs for each individual account. The existing public/private key pairs may be regularly rotated for new public/private key pairs according to a defined security protocol. The public/private key pairs are stored in the key index 150. In certain exemplary embodiments, a key hint may be stored in the user's account and used to select the appropriate key for later decryption.

At block 425, the wallet account management module 125 communicates a an encrypted CVV to the registered client device or devices. The communication from the wallet account management module 125 includes instructions directing the storage of the encrypted CVV in a local storage data structure 108, such as HTML5 local storage, on the client device 105.

At block 430, the client device 105 stores the encrypted CVV in local storage 108. In certain exemplary embodiments, the online wallet API library 155 may further include a storage API or application that is resident on the client device 105 and used to direct storage of the encrypted CVV in the local storage data structure 108.

At block 435, the wallet account management module 125 deletes the unencrypted and encrypted CVV from the OEWS 120.

Returning to FIG. 2, at block 215 where an online purchase is initiated on a client device 105 via interaction with an online merchant web site hosted by the merchant server 110. Block 215 will be described in further detail hereinafter with reference to FIG. 5.

Figure 5:
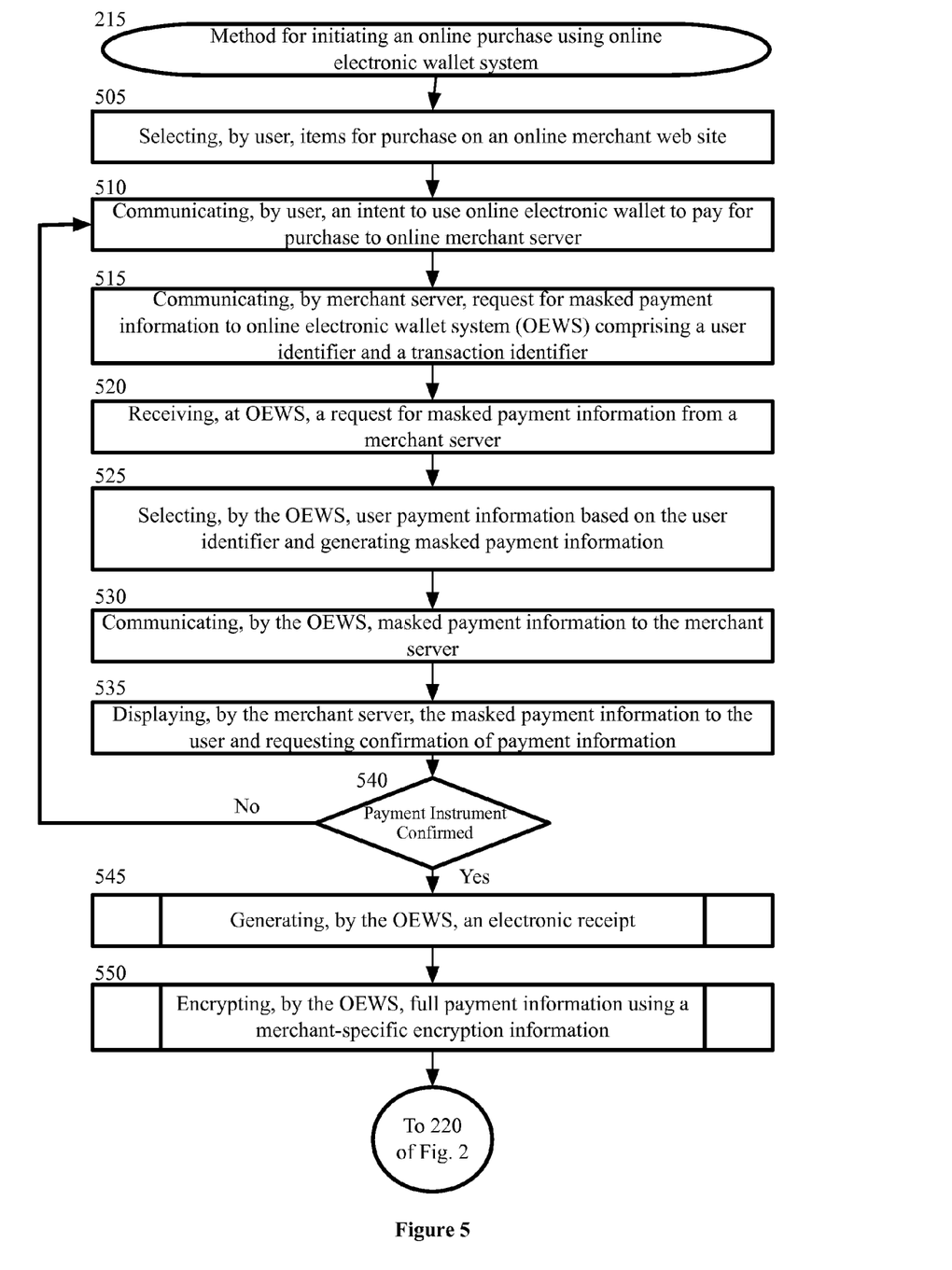
FIG. 5 is a block flow diagram depicting a method for initiating an online purchase using an online electronic wallet system according to an exemplary embodiment.

FIG. 5 is a block flow diagram depicting a process 215 where an online purchase is initiated using the OEWS 120. The process 215 is described with reference to the components in FIG. 1.

Process 215 begins at block 505, where a user, registered with the OEWS 120 selects an item or items to purchase on an online merchant web site hosted by a merchant server 110 from their client device 105. The items may be placed into an online shopping cart or other suitable item tracking device provided by the merchant server 110.

At block 510, the user communicates to the merchant server 110, from their client device 105, an intent to use the OEWS 120. In certain exemplary embodiments, the online API may generate a button for display on the purchase web page of the merchant's web site. Clicking on the button, by the user, communicates to the merchant server 110 that the user intends to use their online electronic wallet account to complete the purchase.

At block 515, the merchant server 110 communicates a request for masked payment information to the OEWS 120 comprising at least a user identifier and a transaction identifier. In certain exemplary embodiments, a user identifier is not communicated to the merchant server 110. Instead, a request function resident in the online API library 155 communicates a request to the client device 105 to communicate the user identifier and a corresponding transaction identifier directly to the OEWS 120. In certain exemplary embodiments the API library 155 may further comprise a payment request API or application resident on the client device 105 to communicate a request for masked and full payment information. As used herein "masked payment information" refers to a portion of payment information, such as the last four digits of a credit card number, sufficient to allow a user to confirm the selected payment instrument, but constituting less than the payment instrument's complete payment information.

At block 520, the wallet account management module 125 receives the masked payment information request from the merchant server 110 and the user identifier from the merchant server 110 or client device 105

At block 525, the wallet account management module 125 selects the corresponding user payment instrument information and generates the masked payment information based on the user identifier. Where the wallet account management module 125 receives a user identifier and transaction identifier from the client device 105 and a transaction identifier from the merchant server 110 as referenced in block 515, the wallet account management module 125 may first verify that the transaction identifiers received from the client device 105 and merchant server 110 match before selecting the user's payment information. The extent of the payment instrument information to be provided in the masked payment information can be pre-defined by an operator of the OEWS 120.

At block 530, the wallet account management module 125 communicates the masked payment information and transaction identifier to the merchant server 110. The wallet account management module 125 stores the transaction identifier with the merchant's account information. In certain exemplary embodiments, the wallet account management module 125 may further assign a confirmation number to the transaction identifier to confirm a latter request for full payment account information.

At block 535, the merchant server 110 communicates the masked payment information to the client device 105 by displaying the masked payment information on the appropriate web page of the merchant's buy flow. In certain exemplary embodiments, the online API library 155 further generates a button for confirmation of selected payment information where the user may click to confirm they wish to utilize the selected payment instrument or change the selected payment instrument.

At block 540, the merchant server 110 receives confirmation of the payment instrument from the client device 105. Where a user indicates they wish to change the payment instrument, blocks 510-540 are repeated before proceeding to block 545.

At block 545, the merchant server 110 communicates a request for full payment information to the OEWS 120. The request for full payment information comprises at least a merchant identifier, a transaction identifier, a user identifier, a final online shopping cart, listing at least the items to be purchased and the purchase price, and optionally a confirmation identifier if previously assigned by the OEWS 120 as described in block 530 above. As with the masked payment information request, if the user identifier is not communicated directly to the merchant server 110, a request function resident in the online API library 155 will request the client device communicate the user identifier and corresponding transaction identifier directly to the OEWS 120 upon initiation of a request for full payment information by the merchant server 110.

At block 545, the wallet account management module 125 receives the request for full payment information from the merchant server 110 or client device 105. Block 545 will be described in further detail hereinafter with reference to FIG. 6.

Figure 6:
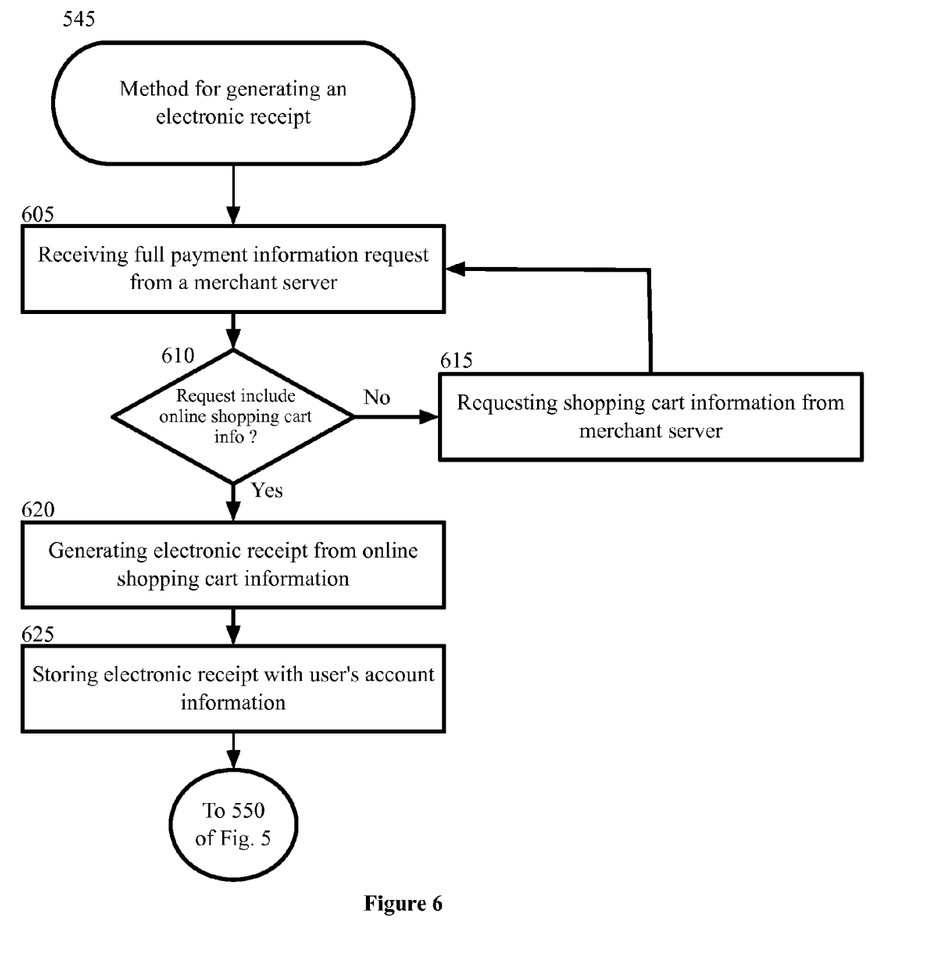
FIG. 6 is a block flow diagram depicting a method for processing a request for full payment information from a merchant server according to an exemplary embodiment.

FIG. 6 is a block flow diagram depicting a process 545 for processing a request for full payment information from a merchant server 110. The process 545 is described with reference to the components in FIG. 1.

The process 545 begins at block 605, where the wallet account management module 125 receives the request for full payment information from the merchant server 110.

At block 610, the wallet account management module 125 determines if the request for full payment information included the final online shopping cart information for the purchase, or if sufficient information is otherwise available to generate a receipt for the transaction. If not, the process 545 proceeds to block 615.

Block 610 can require that the merchant server 110 provide sufficient information to complete a receipt for the transaction. In exemplary embodiments, the information for the receipt can comprise one or more of product identification, price per product, quantity of each product, tax, total price, merchant identification information, date/time of transaction, or any other suitable information that may be included on a receipt. The wallet account management module 125 may obtain portions of the receipt information from the shopping cart information, from other information provided by the merchant, or from other information sources available to the wallet account management module 125. For example, merchant identification information may be extracted from previous information provided by the merchant server 110. Additionally, the wallet account management module 125 may obtain the date/time information for the transaction from an internal date and time source. The wallet account management module 125 determines in block 610 whether sufficient information is available from all sources to generate a receipt for the transaction.

At block 615, the wallet account management module 125 communicates a request for the online shopping cart information sufficient to generate a receipt for the transaction to the merchant server 110. In an exemplary embodiment, the payment process will not continue without receipt of the online shopping cart information. In certain exemplary embodiments, the wallet account management module 125 will time out the process and cancel the transaction if a response is not received from the merchant server 110 with a defined period of time.

Returning to block 610, if the request does include online shopping cart information, or if sufficient information to generate the receipt is otherwise available, then the process 545 proceeds to block 620.

At block 620, the wallet account management module 125 generates an electronic receipt from the online shopping cart information and, if needed, other available information. The electronic receipt can include a simple copy of the online shopping cart information as received from the merchant, or the information contained in the online shopping cart can be extracted and reformatted in a standardized receipt format defined within the wallet account management module 125.

At block 625, the wallet account management module 125 stores the electronic receipt with the user's account information. The method 545 then proceeds to block 550 of FIG. 5.

Returning to FIG. 5 at block 550, the OEWS 120 encrypts the full payment information for communication to the merchant server 110. Block 550 will be described in further detail hereinafter with reference to FIG. 7.

Figure 7:
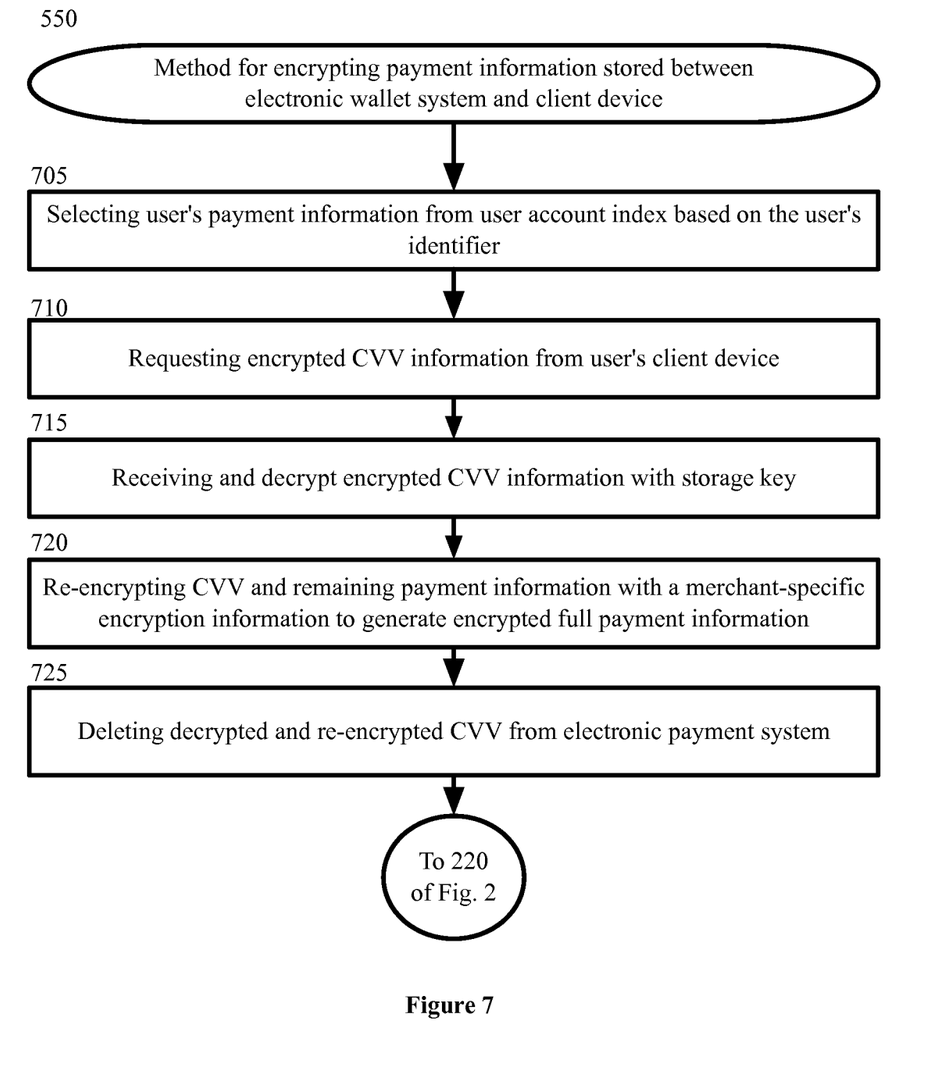
FIG. 7 is a block flow diagram depicting a method for encrypting payment information stored between an online electronic wallet system according to an exemplary embodiment.

FIG. 7 is a block flow diagram depicting a process 550 for encrypting payment information stored between the OEWS 120 and a client device 105. The process 550 is described with reference to the components in FIG. 1.

The process 550 begins at block 705 where the wallet account management module 125 selects the payment instrument information stored in the user's account based on the user identifier included in the request for full payment information received from the merchant server 110 at block 545 of FIG. 5.

At block 710, the wallet account manager 125 then communicates a request for the user's encrypted CVV stored in local storage 108 in the user's mobile device 105 based on the user identifier.

At block 715, the wallet account management module 125 receives the encrypted CVV from the client device 105. The verification code encryption module 130 selects the appropriate storage key or keys and decrypts the CVV.

At block 720, the payment encryption module 135 takes the payment information selected by the wallet account management module 125 from the user's account in the payment instrument server 140 and the CVV decrypted by the verification code encryption module 130 and re-encrypts the full payment information, including the CVV, using the merchant specific encryption key. The payment encryption module 135 selects the appropriate merchant-specific encryption key from the merchant's account using the merchant identifier included in the full payment information request to generate an encrypted full payment information communication.

At block 725, the payment encryption module 135 deletes the decrypted and re-encrypted CVV from the OEWS 120 and the method returns to block 220 of FIG. 2.

Returning to FIG. 2 at block 220, the wallet account management module 125 completes the transaction by communicating the encrypted full payment information package to the merchant server 110 for final payment processing.

General

One or more aspects of the exemplary embodiments may include a computer program that embodies the functions described and illustrated herein, wherein the computer program is implemented in a computer system that comprises instructions stored in a machine-readable medium and a processor that executes the instructions. However, it should be apparent that there could be many different ways of implementing the exemplary embodiments in computer programming, and the exemplary embodiments should not be construed as limited to any one set of computer program instructions. Further, a skilled programmer would be able to write such a computer program to implement an embodiment based on the appended flow charts and associated description in the application text. Therefore, disclosure of a particular set of program code instructions is not considered necessary for an adequate understanding of how to make and use the exemplary embodiments. Moreover, any reference to an act being performed by a computer should not be construed as being performed by a single computer as more than one computer may perform the act.

The exemplary systems, methods, and blocks described in the embodiments presented previously are illustrative, and, in alternative embodiments, certain blocks can be performed in a different order, in parallel with one another, omitted entirely, and/or combined between different exemplary methods, and/or certain additional blocks can be performed, without departing from the scope and spirit of the invention. Accordingly, such alternative embodiments are included in the invention described herein.

The invention can be used with computer hardware and software that performs the methods and processing functions described above. As will be appreciated by those having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments of the invention have been described above in detail, the description is merely for purposes of illustration. Various modifications of, and equivalent blocks and components corresponding to, the disclosed aspects of the exemplary embodiments, in addition to those described above, can be made by those having ordinary skill in the art without departing from the spirit and scope of the invention defined in the following claims, the scope of which is to be accorded the broadest interpretation so as to encompass such modifications and equivalent structures.

What is claimed is:

1. A computer-implemented method for secure storage of payment instrument verification information on a client device, comprising:
   receiving, by a computer from a client device, a first request to register a payment instrument, the first request comprising at least a payment instrument account number and a verification code corresponding to the payment instrument account number and a user identifier associated with an electronic account record stored on a payment instrument server;
   storing, by the computer, the payment instrument account number with the electronic account record associated with the user identifier received in the first request;
   encrypting, by the computer, the verification code to generate an encrypted verification code using one or more encryption keys;
   communicating, by the computer to the client device, the encrypted verification code and executable instructions, the executable instructions when executed by a processor on the client device directing storage of the encrypted verification code in a local storage data structure on the client device;
   deleting, by the computer, the verification code and the encrypted verification code from the computer after communication of the encrypted verification code to the client device;
   receiving, by the computer, a second request for payment information from a merchant server, the second request comprising at least the user identifier; and
   retrieving, by the computer, the encrypted verification code from storage in the local data structure on the client device associated with the user identifier in response to receiving the second request from the merchant server.

2. The method of claim 1, wherein the computer encrypts the verification code using an encryption key maintained by the computer and not shared with the client device.

3. The method of claim 1, wherein the payment instrument is a credit card and the verification code is a card verification value ("CVV").

4. The method of claim 1, and wherein the first request comprises a request to associate the payment instrument with an account maintained by the computer.

5. The method of claim 1, wherein the verification code is encrypted with a first key, and wherein the computer encrypts the first key with a second key and stores the encrypted first key for later decryption of the encrypted verification code.

6. The method of claim 5, wherein the first key is an AES-256 session key, and wherein the second key is a RSA key.

7. The method of claim 1, wherein the local storage data structure on the client device is HTML 5 local storage.

8. A computer program product, comprising:
   a non-transitory computer-readable medium having computer-readable program code embodied therein that when executed by a computer processor cause the computer processor to:
      receive, from a client device, a first request to register a payment instrument, the first request comprising at least a payment instrument account number, a verification code, and a user identifier associated with an electronic account record stored on a payment instrument server;
      store the payment instrument account number with the electronic account record associated with the user identifier received in the first request;
      encrypt the verification code with a private encryption key to generate an encrypted verification code;
      communicate, to the client device, the encrypted verification code and executable instructions, the executable instructions when executed by a processor on the client device directing storage of the encrypted verification code in a local storage data structure on the client device;
      delete the verification code and the encrypted verification code from the computer's memory after communication to the client device;
      receive a second request for payment information from a merchant server, the second request comprising at least the user identifier; and
      retrieve the encrypted verification code from storage in the local data structure on the client device associated with the user identifier in response to receiving the second request from the merchant server.

9. The computer program product of claim 8, wherein the computer readable program code encrypts the verification code using an encryption key not shared with the client device.

10. The computer program product of claim 8, wherein the payment instrument is a credit card and the verification code is a CVV.

11. The computer program product of claim 8, wherein the first request comprises a request to associate the payment instrument with an account maintained by the computer.

12. The computer program product of claim 8, wherein the verification code is encrypted with a first key, and the first key is encrypted with a second key.

13. The computer program product of claim 8, wherein the first key is an AES-256 session key, and the second key is a RSA key.

14. The computer program product of claim 8, wherein the local storage data structure is HTML 5 local storage.

15. A system for the secure storage of payment instrument verification information on a client device, the system comprising:
   a storage device;
   a network device; and
   a processor communicatively coupled to the storage and the network device, the processor executing application code instructions that are stored in the storage device and that cause the system to:
      receive a first request to register a payment instrument from a client device, the first request comprising at least a payment instrument account number, a verification code corresponding to the payment instrument account number, and a user identifier, the user identifier being associated with an online electronic account record stored in the storage device;
      store the payment instrument account number in the online electronic account record stored in the storage device and identified by the user identifier;
      encrypt the verification code using one or more encryption keys to generate an encrypted verification code;
      communicate the encrypted verification code and executable instructions to the client device, the executable instructions when executed by a processor on the client device storing the encrypted verification code in a local storage data structure on the client device;
      delete the verification code and the encrypted verification code from the system after communicating the encrypted verification code to the client device;

receive a second request for payment information from a merchant server, the second request comprising at least the user identifier; and retrieve the encrypted verification code from storage in the local data structure on the client device associated with the user identifier in response to receiving the second request from the merchant server.

16. The system of claim 15, the system encrypting the verification code with an encryption key maintained on the system and not shared with the client device.

17. The system of claim 15, wherein the payment instrument is a credit card and the verification code is a card verification value ("CVV").

18. The system of claim 15, the first request comprising a request to associate the payment instrument with an account maintained by the system.

19. The system of claim 15, the system encrypting the verification code with a first key and storing the first key for later decryption of the encrypted verification code, the first key further encrypted by the system with a second key.

20. The system of claim 19, wherein the first key is an AES-256 session key, and the second key is a RSA key.

21. The system of claim 15, wherein the local data storage data structure on the client device is HTML 5 local storage.

22. The method of claim 1, further comprising communicating, by the computer, the payment instrument account number stored by the computer and the verification code retrieved from the client device to the merchant server.

* * * * *